United States Patent [19]
Statz

[11] 3,799,625
[45] Mar. 26, 1974

[54] SUSPENSION SYSTEM FOR SNOW VEHICLE

[76] Inventor: Robert G. Statz, 2478 N. 66 St., Milwaukee, Wis. 53210

[22] Filed: June 12, 1972

[21] Appl. No.: 261,918

[52] U.S. Cl. .............. 305/24, 305/27, 287/53 SS
[51] Int. Cl. .................. B62m 27/02, B62d 55/16
[58] Field of Search ............. 305/24, 27; 180/5 R; 267/57.1 R, 57.1 A; 403/1, 459, 4; 287/53 SS

[56] References Cited
UNITED STATES PATENTS

| | | | |
|---|---|---|---|
| 3,706,481 | 12/1972 | Kramer | 305/27 |
| 2,609,194 | 9/1952 | Krotz | 267/57.1 A |
| 3,637,265 | 1/1972 | Valentine | 305/24 |
| 2,773,699 | 12/1956 | Gramman | 267/57.1 R X |
| 3,688,858 | 9/1972 | Jesperson | 305/27 |

FOREIGN PATENTS OR APPLICATIONS

| | | | |
|---|---|---|---|
| 1,925,325 | 11/1970 | Germany | 305/27 |

Primary Examiner—Richard J. Johnson
Attorney, Agent, or Firm—Michael, Best & Friedrich

[57] ABSTRACT

A track suspension system for a snow vehicle including a plurality of longitudinally spaced suspension assemblies mounted on the snow vehicle frame. Each of the suspension assemblies is comprised of a shaft member having a plurality of bogie wheel units independently and resiliently mounted thereon. Each of the bogie wheel units includes an arm having a bogie wheel rotatably mounted thereon with the arm fastened to an outer collar member. An inner collar member is resiliently mounted inside the outer collar by means of a rubber sleeve bonded to the two collars. The inner collar is mounted on the shaft in a non-rotatable relationship. The shaft of each suspension assembly is mounted on the snow vehicle frame in fixed relationship thereto. Forces exerted on the system through the track will be absorbed by the resilient material bonded between the inner and outer collars. Since each bogie wheel unit is independently mounted on the respective shafts, a shock force received on one bogie wheel unit will not cause a reaction at some other part of the suspension system.

10 Claims, 9 Drawing Figures

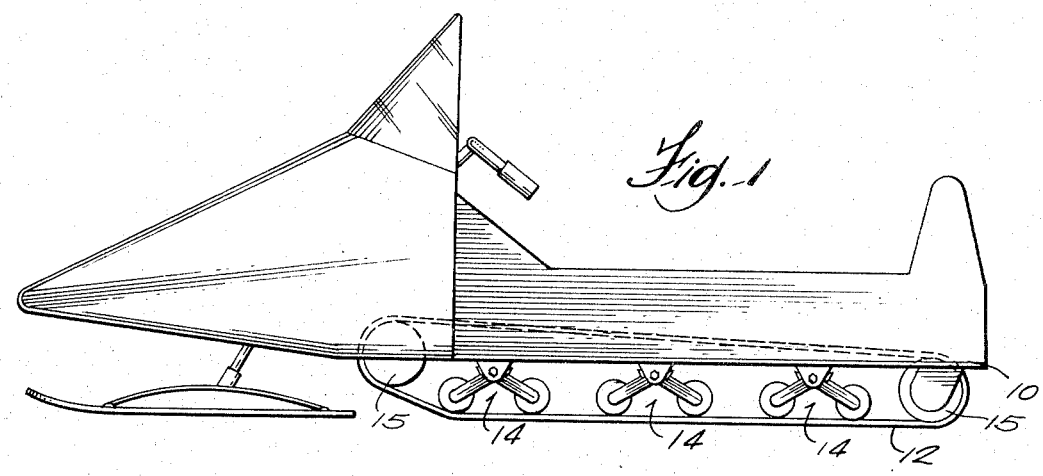
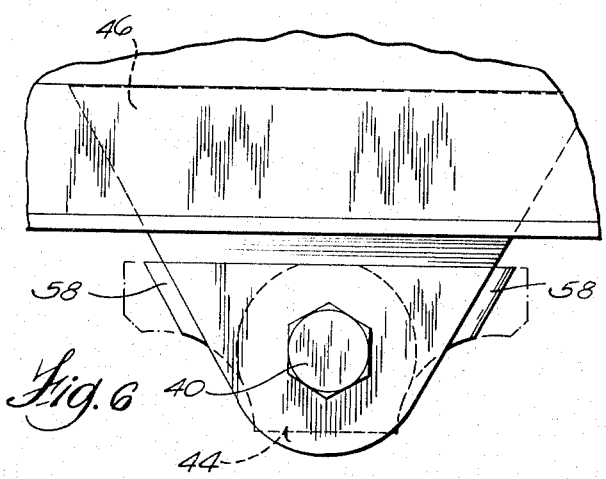
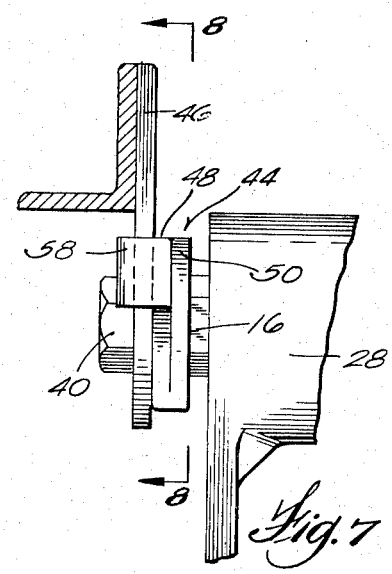
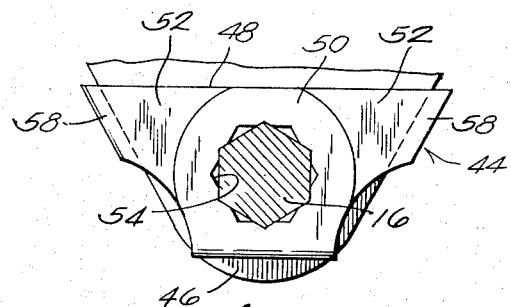
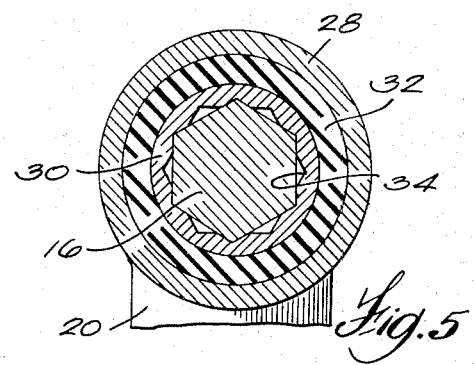

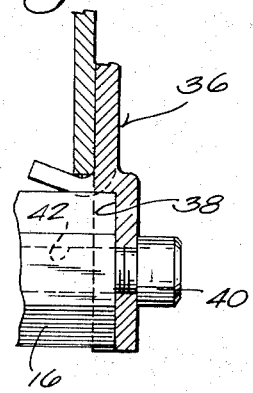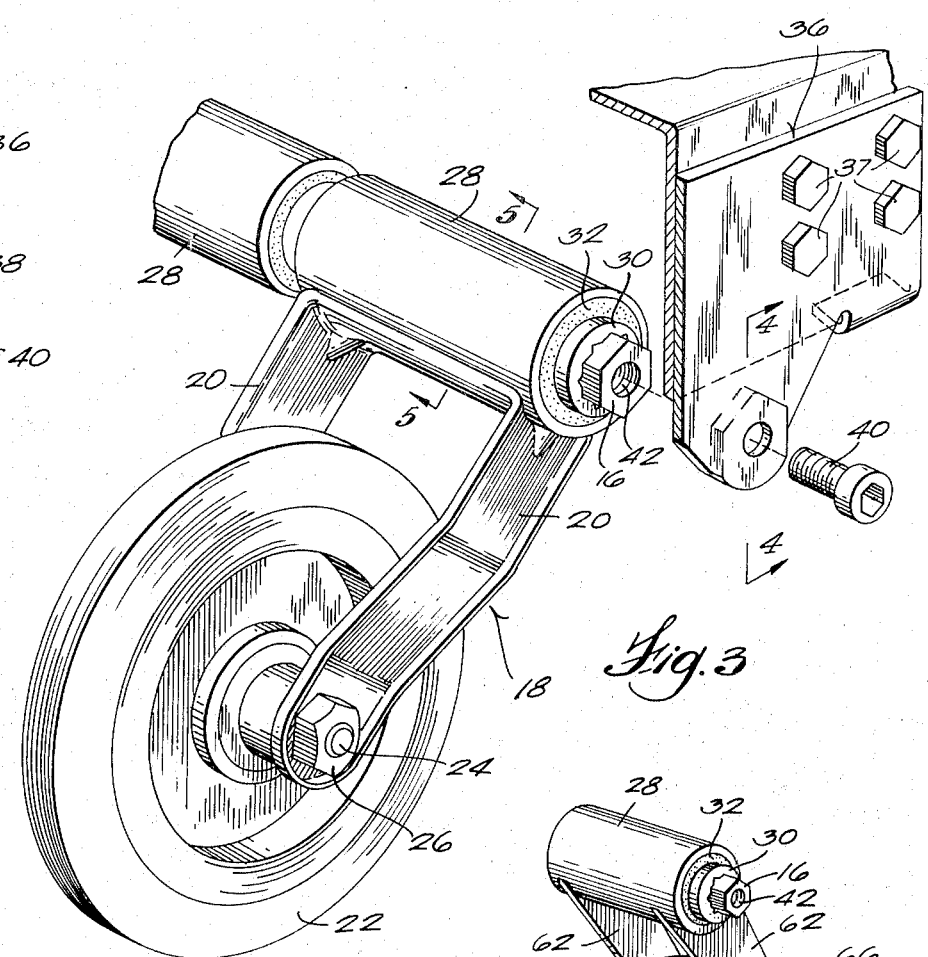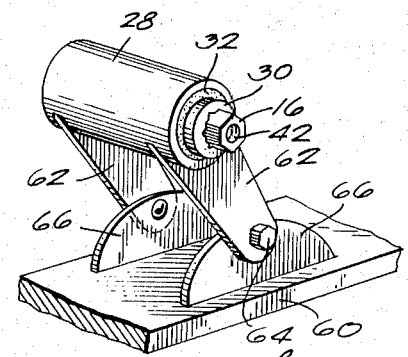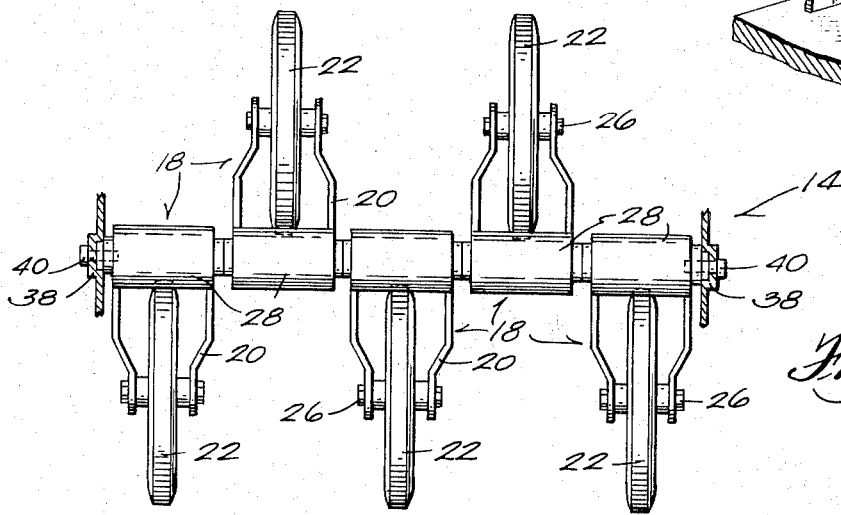

SUSPENSION SYSTEM FOR SNOW VEHICLE

BACKGROUND OF THE INVENTION

In the conventional bogie wheel snow vehicle suspension system a plurality of metal spring members are utilized to absorb the shock forces received through the vehicle track in operation. In such systems a shock force received on one part of the suspension will usually cause an opposite reaction on a different part of the suspension resulting in a certain inherent lack of stability and smooth riding characteristics. Such arrangement utilizes a number of metal-to-metal moving parts and thus tends to have rather poor noise characteristics. The present invention very effectively overcomes these shortcomings. Generally speaking this is accomplished by a system wherein each bogie wheel unit is independently and resiliently mounted with respect to each other on a stationary shaft. The resilient mounting means includes a sleeve of resilient material such as rubber to thereby minimize noise due to vibration.

SUMMARY OF THE INVENTION

A track suspension system for a snow vehicle comprising a snow vehicle frame and a plurality of longitudinally spaced suspension assemblies mounted on the frame. Each of the suspension assemblies includes a shaft member and a means for mounting the shaft member in a fixed relationship with respect to the snow vehicle frame. A plurality of bogie wheel units are independently and resiliently mounted on the shaft member by means of inner and outer collar members having a sleeve of resilient material, such as rubber, bonded therebetween. The inner collar of each bogie wheel unit is slidably mounted on the shaft in a non-rotatable relationship thereto. This is accomplished by the use of a hexagonal shaft which is slidably mounted in a 12-sided opening in the inner collar member. The bogie wheel units are mounted on the shaft of each suspension assembly with adjacent units extending therefrom in opposite directions and with the bogie wheels of each unit angled downwardly from the horizontal for contact with the track of the snow vehicle.

DESCRIPTION OF THE DRAWINGS

FIG. 1 is a partially schematic side elevation view showing a snow vehicle which embodies the suspension system of the present invention;

FIG. 2 is a bottom plan view of one of the suspension assemblies shown in FIG. 1;

FIG. 3 is a fragmentary exploded perspective view of a portion of the suspension assembly shown in FIG. 2;

FIG. 4 is a fragmentary sectional view taken along line 4—4 of FIG. 3;

FIG. 5 is a sectional view taken along line 5—5 of FIG. 3;

FIG. 6 is a fragmentary side elevation view showing an alternative arrangement for mounting a suspension on the frame of a snow vehicle;

FIG. 7 is an end elevation view of the mounting arrangement shown in FIG. 6;

FIG. 8 is a sectional view taken along line 8—8 of FIG. 7; and

FIG. 9 is a view similar to FIG. 3 but showing a second embodiment of the present invention.

DESCRIPTION OF THE PREFERRED EMBODIMENT

Referring to the drawings in detail, FIG. 1 shows a snow vehicle having a frame 10 on which the endless drive track 12 is mounted. The vehicle and track are supported by a suspension system which is comprised of a plurality of individually mounted suspension assemblies 14 and a pair of sprocket wheels 15, 15. The subject matter of this invention resides in the particular construction of suspension assemblies 14. While the suspension system shown in FIG. 1 includes a total of three suspension assemblies 14, it should be understood that the number used can vary to some extent depending on the size of the vehicle and other factors.

Each support assembly is comprised of a support shaft member 16 and a plurality of bogie wheel units 18 mounted on the shaft.

Each bogie wheel unit is comprised of a double arm support member 20 and a bogie wheel 22 rotatably mounted thereon by a shaft 24 and a retaining nut 26. Bogie wheel 22 may be of any suitable design such as that shown in U.S. Pat. No. 3,565,490.

Double arm support member 20 may be made integrally with or fastened to an outer collar member 28. As best shown in FIG. 5, a second inner collar member 30 is resiliently mounted inside outer member 28. Such resilient mounting is preferably made by means of a sleeve or liner 32 of resilient material such as rubber, which has been securely bonded to the outer surface of collar 30 and the inner surface of collar 28.

As best shown in FIG. 2, a plurality of bogie wheel units 18 are mounted on shaft 16 to form a single suspension assembly 14 which assembly is then mounted on the vehicle frame 10 as will be described in detail hereinafter.

Referring again to FIG. 5, in the preferred embodiment shaft 16 is of a non-circular cross section and the opening 34 in inner collar 30 is also of a non-circular cross section so that bogie wheel units 18 can be slidably mounted on the shaft in a manner wherein shaft 16 and collar 30 will be locked against relative rotation with respect to each other. While the particular configuration of shaft 16 and opening 34 can vary, in the particular embodiment shown in the drawings, shaft 16 is of hexagonal cross section and opening 34 is of a 12-sided shape with each side being equal to each other.

As shown in FIG. 3, each suspension assembly 14 is removably mounted on the snow vehicle frame 10 by means of a pair of mounting brackets 36 (only one shown in drawings). The brackets 36 are mounted on the frame by any suitable means such as bolts 37. Each bracket 36 is provided with an embossed nest 38 shaped to receive the end of hexagonal shaft 16 in locking relationship. To mount the spring assembly 14 on the frame, the ends of shaft 12 are slipped vertically upwardly into nest 38 where they are locked in place by bolts 40 threaded into the threaded openings 42 in the ends of the shaft.

The above described suspension assembly mounting arrangement is designed for installation of such suspension assemblies in a new snow vehicle. An alternative mounting arrangement designed for installation of such suspension assemblies in an existing snow vehicle as a replacement for a different suspension system is shown in FIGS. 6, 7 and 8. In this arrangement a specially designed adapter or bracket member 44 is used in combination with an existing mounting bracket 46. In its preferred form bracket member 44 is made from an aluminum stamping having portions 48 and 50 which are bent over against each other as best shown in FIG. 7. Portion 48 is provided with a pair of arms 52,52 as shown in FIGS. 6 and 8. A 12-sided opening 54 is formed in the central portion of the bent over bracket for receiving the end of hex-shaft 16. Brackets 44 are furnished to the customer with arms 52, 52 in an unbent condition (see dotted lines in FIG. 6). The customer then mounts the replacement suspension assembly on his snow vehicle by first slipping a bracket 44 on the end of each shaft 16 and then installing a pair of retaining bolts 40 as shown in FIG. 7. The ends 58 of bracket arms 52 are then bent over the edges of the existing bracket 46 to thereby prevent any tendency of bracket 44 to move with respect to bracket 46. By having the customer bend the ends of arms 52, a bracket 44 of a single given shape can be used with existing bracket 46 of various shapes. With bracket 44 locked to bracket 46 and with the shaft 16 locked in openings 54, the shaft 16 will be locked with respect to the snow vehicle frame in essentially the same manner as described above with respect to FIGS. 3 and 4.

When installing spring assemblies on a snow vehicle as described above, each adjacent bogie unit 18 is faced in the opposite direction and is angled downwardly from the horizontal a given number of degrees (see FIGS. 1, 2 and 3). The angle selected for any particular suspension system can vary to some extent and will have a bearing on the riding characteristics of the snow vehicle. Should the snow vehicle owner ever wish to change the bogie wheel unit angle, this can be readily accomplished by removing each suspension assembly 14 and then reinstalling the bogie wheel units 18 on the shaft 16 at the desired new angle. It will be appreciated that by using a hex-shaft 16 and a 12-sided opening 34 in collar 30, adjustments at increments of 30° can be made. While there may be several reasons for adjusting the bogie unit angle, one example would be to shift more of the weight of the vehicle forward onto the steering runners to thereby provide a more positive steering action for running in packed snow. This could be accomplished by increasing the angle of the bogie wheel units from the horizontal. The angle of the bogie units on any single shaft 16 could also be varied to preload the units on one side or the other with respect to the track for purposes of providing improved stability for racing on a closed track.

In use the suspension system of this invention operates as follows. Forces exerted on the system through the track, due for example to a bump on the trail, will be absorbed primarily by the resilient material 32 bonded between collars 28 and 30 of the bogie wheel units. Since each bogie unit is independently and resiliently mounted on the respective shafts, a shock force received on one bogie unit will not cause a reaction at some other part of the suspension system as is the case with a conventional suspension system. Improved stability, increased speed and smoother riding characteristics are thus obtained.

Another important advantage is the improved noise characteristics provided by the system. This, of course, is due to the resilient and independent mounting arrangement of each bogie wheel unit using a minimum number of moving parts with no metal-to-metal contact and/or vibration between any of the moving parts.

Other important advantages of the system are its light weight, relatively low cost, reduced maintenance and ease of replacement and repair. It will also be appreciated that by the use of suitable spacers positioned between adjacent bogie units 18, the system can be readily adapted for installation on both narrow and wide track snow vehicles. Finally, it is noted that due to the use of a fixed supporting shaft 16 for the bogie units, there is no possibility for a suspension assembly to be pivoted to an inverted position under extreme operating conditions as is the case with a conventional suspension system.

The description of the present invention to this point relates to a so called "bogie wheel" type of suspension. It should be appreciated, however, that the basic construction of the present invention could be employed in a so-called "slide" type suspension. In this regard reference is made to FIG. 9 which shows a unit adapted for use with a slide 60. Just as with bogie wheel units 18, each slide unit is comprised of a double arm support 62, 62 attached to slide member 60 by mounting ears 66, 66 and suitable bolts 64, 64.

Double arm support 62, 62 may be made integrally with or fastened to an outer collar member 28 having an inner collar member 30 resiliently mounted therein by means of a sleeve 32 of resilient material as previously described. The unit can be mounted on the frame by means of a hex-shaft 16 in a manner previously described.

With the slide arrangement shown in FIG. 9 each unit is angled downwardly and rearwardly as shown. The slide rides in contact with the track of the snow vehicle. In some types of slide suspension systems two (2) slides are employed, one along each edge of the track. In other types four (4) slides are employed, two (2) (one behind the other) along each edge of the track. In either arrangement each slide member will be supported by at least two (2) units of the type shown in FIG. 9. Thus when forces are exerted on the slides through the track, such forces will be absorbed primarily by the resilient material 32 bonded between collars 28 and 30. The system thus operates with substantially the same important advantages as with the bogie wheel suspension system described above.

I claim:

1. A track suspension system for a snow vehicle comprising:

a snow vehicle frame;

a plurality of longitudinally spaced suspension assemblies mounted on said snow vehicle frame, each of said suspension assemblies comprised of a shaft member, a mounting means for mounting said shaft member on said frame, and a plurality of bogie wheel units independently mounted on said shaft member, each of said bogie wheel units comprised of an arm member, a bogie wheel rotatably mounted on said arm member and a resilient mounting means for mounting said arm member on said shaft member, said resilient mounting means adapted to resist relative rotational movement of said arm member with respect to said shaft, said bogie wheel units mounted on said shaft with the arms of adjacent units extending in opposite directions and with the bogie wheels of each unit positioned in contact with the track of the snow vehicle, said mounting means for mounting said shaft member on said frame comprised of a depending mounting bracket having an opening therein and an adapter bracket adapted to receive the end of the shaft in a non-rotatable relationship, said adapter bracket having a pair of ears which when bent over the edges of said mounting bracket will prevent any tendency of said adapter bracket to rotate with respect to said mounting bracket.

2. A track suspension system for a snow vehicle according to claim 19 in which said resilient mounting means includes an outer collar member fastened to said arm member, an inner collar member positioned within said outer collar member and a resilient material means mounted between said inner and outer collar members adapted to resist relative movement between said collars, said inner collar member being mounted on said shaft in a non-rotatable relationship.

3. A track suspension system for a snow vehicle according to claim 2 in which said resilient material means is comprised of a sleeve of resilient material bonded to the outer surface of said inner collar member and to the inner surface of said outer collar member.

4. A track suspension system for a snow vehicle according to claim 3 in which said sleeve of resilient material is made of rubber.

5. A track suspension system for a snow vehicle according to claim 2 in which said inner and outer collar members have a circular cross section.

6. A track suspension system for a snow vehicle according to claim 2 in which said inner collar member has an opening therein through which said shaft extends, said opening and shaft having a non-circular cross section so that such shaft cannot rotate with respect to said inner collar member.

7. A track suspension system for a snow vehicle according to claim 6 in which said shaft has a hexagonal cross section and said opening in said inner collar member is a 12-sided opening with each side being equal to each other.

8. A track suspension system for a snow vehicle comprising:
a snow vehicle frame;
a plurality of longitudinally spaced suspension assemblies mounted on said snow vehicle frame, each of said suspension assemblies comprised of a shaft member, a mounting means for mounting said shaft member on said frame, and a plurality of support units independently mounted on said shaft member, each of said support units comprised of an arm member, a track engaging member mounted on said arm member and a resilient mounting means for mounting said arm member on said shaft member, said resilient mounting means adapted to resist relative rotational movement of said arm member with respect to said shaft, said support units mounted on said shaft with the arms angling downwardly from the horizontal and with the track engaging member of each unit positioned in contact with the track of the snow vehicle;

said resilient mounting means including an outer collar member fastened to said arm member, an inner collar member positioned within said outer collar member and a resilient material means mounted between said inner and outer collar members adapted to resist relative movement between said collars, said inner collar member being mounted on said shaft in a non-rotatable relationship therewith, said resilient material means being comprised of a sleeve of resilient material bonded directly to the outer surface of said inner collar member and directly to the inner surface of said outer collar member;

said inner collar members having an opening therein through which said shafts extend, said shafts having a hexagonal cross section and said openings in said inner collar members being a 12-sided opening with each side being equal to each other.

9. A track suspension system for a snow vehicle according to claim 8 in which said mounting means for mounting said shaft member on said frame is comprised of a depending bracket member having an embossed nest formed therein for receiving the end of said shaft in a non-rotatable relationship.

10. A track suspension system for a snow vehicle according to claim 9 in which said embossed nest is open at the bottom thereof so that said shaft can be slipped vertically upwardly into the nest.

* * * * *

PO-1050
(5/69)

UNITED STATES PATENT OFFICE
CERTIFICATE OF CORRECTION

Patent No. 3,799,625　　　　　　　　　Dated　March 26, 1974

Inventor(s)　Robert G. Statz

It is certified that error appears in the above-identified patent and that said Letters Patent are hereby corrected as shown below:

Column 5, line 9, "claim 19" should read --claim 1--.

Signed and sealed this 16th day of July 1974.

(SEAL)
Attest:

McCOY M. GIBSON, JR.　　　　　　　　　　　　C. MARSHALL DANN
Attesting Officer　　　　　　　　　　　　　Commissioner of Patents